C. FEROCI.
AUTOMATIC RAILWAY CAR AND COMPRESSED AIR AND STEAM PIPE COUPLING DEVICE.
APPLICATION FILED JUNE 16, 1915.

1,217,734.

Patented Feb. 27, 1917.
3 SHEETS—SHEET 1.

INVENTOR
Cesare Feroci
By Wm Wallace White
ATTY

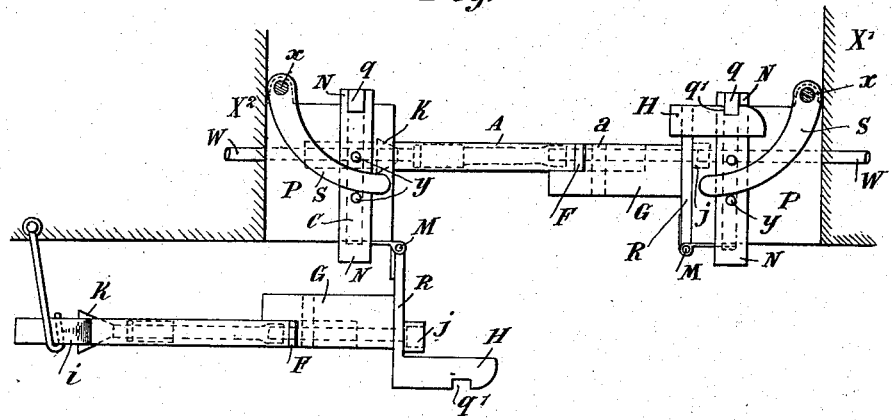
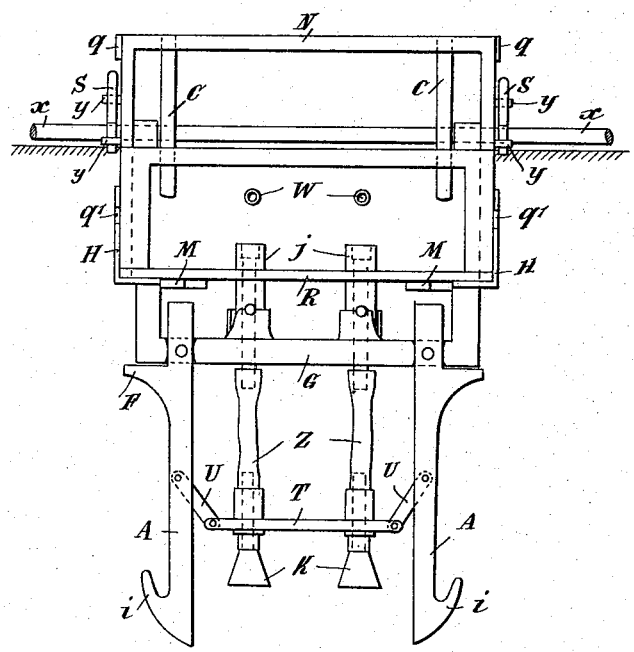

C. FEROCI.
AUTOMATIC RAILWAY CAR AND COMPRESSED AIR AND STEAM PIPE COUPLING DEVICE.
APPLICATION FILED JUNE 16, 1915.
1,217,734.
Patented Feb. 27, 1917.
3 SHEETS—SHEET 3.
Fig. 4.
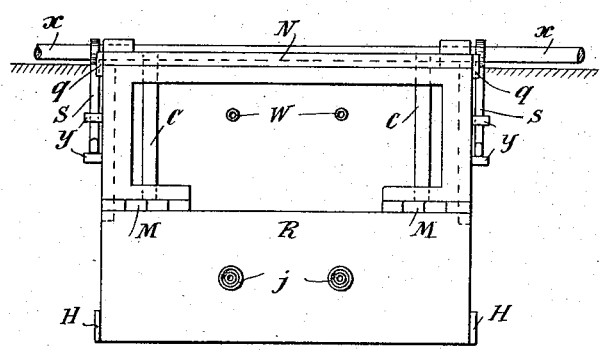
Fig. 5.
Fig. 6.
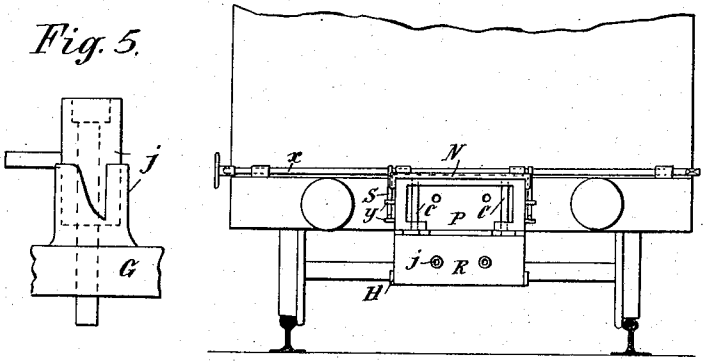
INVENTOR:
Cesare Feroci
By
M. Wallace White
ATTY

UNITED STATES PATENT OFFICE.

CESARE FEROCI, OF ROME, ITALY.

AUTOMATIC RAILWAY-CAR AND COMPRESSED-AIR AND STEAM PIPE COUPLING DEVICE.

1,217,734. Specification of Letters Patent. Patented Feb. 27, 1917.

Application filed June 16, 1915. Serial No. 34,460.

*To all whom it may concern:*

Be it known that I, CESARE FEROCI, a subject of the King of Italy, residing at Rome, gentleman, whose post-office address is Via Mecenate 79, Rome, Italy, have invented certain new and useful Improvements in Automatic Railway-Car and Compressed-Air and Steam Pipe Coupling Devices, of which the following is a specification.

The object of my present invention is to provide a mechanical device for automatically coupling railway cars and their steam and compressed air pipes, my said device being secured to both ends of the car.

Fig. 2 is a side view of above;

Fig. 3 is an enlarged plan view, the parts being shown in open or uncoupled positions;

Fig. 4 shows the device in open position and hanging down from the vehicle, ready for coupling action, the receiving parts being put in evidence;

Fig. 5 is a detail view of locking device for producing greater pressure in the steam and compressed air pipe coupling, and Fig. 6 is a rear elevation of a car with the coupling box opened in the same position as that shown in Fig. 4.

Figure 1:
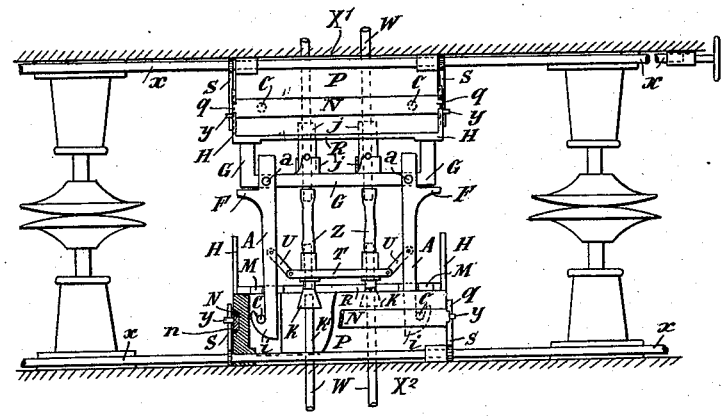
Figure 1 is a plan view, showing the application of the invention to two adjacent car ends.

The apparatus comprises two distinct parts, the one of which may be termed the "penetrating" part, and the other the "receiving" or counter-part, the former being attached to one, and the latter to the other end of the car to be coupled.

The penetrating part of the apparatus is hinged to a block fixed to the frame of the car, while the receiving part comprises a trapezoidal support with a vertically sliding U-shaped slide the arms of which form pivots designed to engage hooks on the penetrating part of the apparatus.

The slide is controlled by a cam pivoted to the trapezoidal support and operated from outside the vehicle by a lever consisting of pivoted pieces.

The coupling device is identical for both vehicles to be coupled, that is to say capable of acting both as penetrating and receiving apparatus.

The apparatus mainly comprises a rectangular prismatic box P rigidly attached to the frame of the vehicle, in combination with a slide N capable of sliding vertically and provided on the outside with locking teeth —$q$— and on the inside with two strong pivots C forming, with the hereafter described hooks, the draw-gear.

The movement of slide N is guided by grooves in the ends of the box.

The front end R of the box has hinges M permitting of a rotation of 270°. By rotating it 180° it leaves the box open to admit the receiving parts of the coupling. This movable part is provided on its outside with a yoke G on which metal bars A with hooks —$i$— on their outer ends are so fixed as to be able to swing in horizontal direction, and the purpose of which is to engage the pivot C of the similar device on an adjacent car. Arms H placed at right angles and forming an integral part of end R are adapted to receive in suitable grooves the teeth —$q$— provided on the movable slide N and effect the engagement of the box in a way capable of resisting the traction strain.

The coupling device further comprises a horizontal shaft —$x$— capable of being operated from the outside and rotated by a wrench or crank, and is provided with two arms S which by the forces exercised by them on the pivots —$y$— in the rotation of the shaft cause the slide to rise or descend, thus engaging and disengaging the pivots C with, or from, hooks —$i$— of bars A.

In the coupling the bars A pivoted at —$a$— have spurs F at their back part. Bars A are connected together by pivoted tie-rods T and U. Tie-rods T support the steam and compressed air pipes Z the ends K of which are hopperlike enlarged without being protected by springs, while ends $K^1$ of pipes W of the receiving apparatus are of the usual form. Pipes Z within yoke G are each provided with a slide or cam for producing, when the cars are coupled, a greater pressure of the ends of the pipes at the point of connection by which tight closure between the pipes of the two cars is effected.

The operation of the above described coupling devices is as follows:

Suppose car $X^1$ has the box closed and the penetrating apparatus in horizontal position, that is to say with bars A placed horizontally and car $X^2$ which is to be coupled has the box open and therefore bars A hanging down from the frame (Fig. 2) and suitably fixed the bars A of car $X^1$ when pushed against car X² enter between the two pivots C (Fig. 1), and the hooks when moved past the said pivots engage the latter. At the same time the ends of pipes K¹ of car X² enter the flaring ends K of the pipes of car X¹ so that both the steam and the compressed air pipes are automatically connected together and the cars coupled.

Having now described my said invention I claim:

1. A car coupling comprising a rigid supporting member, a member pivoted to the supporting member to swing in a vertical plane, drawbars carried by the pivoted member, drawbar retaining members carried by the supporting member, means for moving the retaining members, and pipe connections supported from the pivoted member.

2. A car coupling comprising a rigid supporting member, a member pivoted to the supporting member to swing in a vertical plane, drawbars carried by the pivoted member, drawbar retaining means carried by the supporting members, means for retaining the pivoted member in locked position, means for moving the retaining member and pipe connections supported from the pivoted member.

3. A car coupling comprising a rigid supporting member, a member pivoted to the supporting member to swing in a vertical plane, drawbars carried by the pivoted member, drawbar retaining members carried by the supporting member, means for moving the retaining members, pipe retaining members pivoted to the drawbars and pipe connections carried by the pipe retaining members.

4. A car coupling comprising a rigid supporting member, a member pivoted to the supporting member to swing in a vertical plane, and provided with pipe supporting extensions, drawbars carried by the pivoted member, drawbar retaining members carried by the supporting member, means for moving the retaining members, and pipe connections extending from the pipe supporting extensions.

5. A car coupling comprising a rigid supporting member, a frame disposed on the supporting member to slide in a vertical plane and provided with lugs, a drawbar supporting member pivoted to the frame and provided with extensions having notches to engage the lugs, means for moving the frame vertically, drawbars and pipe connections carried by the pivoted frame and drawbar retaining members on the frame.

6. A car coupling comprising a rigid supporting member, a frame disposed on the supporting member to slide in a vertical plane and provided with lugs, a drawbar supporting member pivoted to the frame and provided with extensions having notches to engage the lugs, pins on the sides of the frame, actuating members disposed to engage the pins, a rockable member to which the actuating members are secured, and drawbar and pipe connections carried by the pivoted frame and drawbar retaining members on the frame.

In testimony whereof I have signed my name to this specification in presence of two subscribing witnesses.

CESARE FEROCI.

Witnesses:
ADOLFO LIVERANI,
DUILIO NARDOVI.

Copies of this patent may be obtained for five cents each, by addressing the "Commissioner of Patents, Washington, D. C."